(12) United States Patent
Ramsey

(10) Patent No.: US 10,108,888 B2
(45) Date of Patent: Oct. 23, 2018

(54) MATRIX BARCODES ON CAN COMPONENTS

(71) Applicant: Crown Packaging Technology, Inc., Alsip, IL (US)

(72) Inventor: Christopher Paul Ramsey, Oxfordshire (GB)

(73) Assignee: Crown Packaging Technology, Inc., Alsip, IL (US)

( * ) Notice: Subject to any disclaimer, the term of this patent is extended or adjusted under 35 U.S.C. 154(b) by 219 days.

(21) Appl. No.: 14/773,908

(22) PCT Filed: Mar. 12, 2014

(86) PCT No.: PCT/US2014/023878
§ 371 (c)(1),
(2) Date: Sep. 9, 2015

(87) PCT Pub. No.: WO2014/150647
PCT Pub. Date: Sep. 25, 2014

(65) Prior Publication Data
US 2016/0034805 A1  Feb. 4, 2016

Related U.S. Application Data

(60) Provisional application No. 61/787,742, filed on Mar. 15, 2013.

(51) Int. Cl.
| | | |
|---|---|---|
| B65D 85/00 | (2006.01) | |
| G06K 19/06 | (2006.01) | |
| B23K 26/00 | (2014.01) | |
| B65D 1/12 | (2006.01) | |
| B65D 25/20 | (2006.01) | |
| B65D 17/28 | (2006.01) | |

(52) U.S. Cl.
CPC .... *G06K 19/06037* (2013.01); *B23K 26/0087* (2013.01); *B65D 1/12* (2013.01); *B65D 17/4012* (2018.01); *B65D 25/205* (2013.01); *G06K 19/06028* (2013.01); *G06K 19/06046* (2013.01); *G06K 19/06121* (2013.01); *B65D 2517/0013* (2013.01)

(58) Field of Classification Search
CPC ....... G06K 19/06037; G06K 19/06121; G06K 19/06028; G06K 19/06046; B65D 25/205; B65D 1/12; B65D 117/165; B65D 2517/0013; B23K 26/0087
USPC ...... 206/459.5; 220/906, 269, 270, 272, 273
See application file for complete search history.

(56) References Cited

U.S. PATENT DOCUMENTS

| | | | | |
|---|---|---|---|---|
| 5,492,222 A | * | 2/1996 | Weaver | B65D 71/504 |
| | | | | 206/150 |
| 5,544,749 A | * | 8/1996 | Watts | B65D 71/504 |
| | | | | 206/150 |

(Continued)

FOREIGN PATENT DOCUMENTS

| | | |
|---|---|---|
| CN | 1313801 A | 9/2001 |
| JP | 2000-222516 A | 8/2000 |

(Continued)

*Primary Examiner* — Jacob K Ackun
*Assistant Examiner* — Jenine Pagan
(74) *Attorney, Agent, or Firm* — Baker & Hostetler LLP

(57) ABSTRACT

A matrix barcode on a can component, such as a can end panel, a pull tab of a can end, or the coil stock, is formed by laser application that makes spots that represent the matrix barcode modules.

20 Claims, 8 Drawing Sheets

(56) References Cited

U.S. PATENT DOCUMENTS

| | | | | |
|---|---|---|---|---|
| 5,682,983 A * | 11/1997 | Weaver | ............... | B65D 71/504 |
| | | | | 206/150 |
| 5,855,969 A * | 1/1999 | Robertson | .............. | B41M 5/267 |
| | | | | 427/387 |
| 6,105,806 A | 8/2000 | Stasiuk | | |
| 6,372,293 B1 * | 4/2002 | Mathus | ................ | B01L 3/5453 |
| | | | | 156/239 |
| 6,433,302 B1 * | 8/2002 | Miller | .................. | B21D 51/383 |
| | | | | 219/121.68 |
| 6,498,318 B1 | 12/2002 | Miller et al. | | |
| 6,501,046 B1 * | 12/2002 | Miller | .................. | B21D 51/383 |
| | | | | 219/121.69 |
| 6,706,995 B2 * | 3/2004 | Miller | .................. | B21D 51/383 |
| | | | | 219/121.68 |
| 7,602,409 B2 * | 10/2009 | Sato | ...................... | G06K 1/126 |
| | | | | 347/224 |
| 7,744,964 B2 * | 6/2010 | Phillips | ................. | D21H 21/42 |
| | | | | 427/209 |
| 8,910,859 B2 * | 12/2014 | Massicot | ............ | G06K 9/00577 |
| | | | | 235/375 |
| 9,007,413 B2 | 4/2015 | Boisvert | | |
| 2007/0279474 A1 | 12/2007 | Sato | | |
| 2011/0084051 A1 | 4/2011 | Reed et al. | | |
| 2013/0270269 A1 * | 10/2013 | Lewis | .................... | B41M 5/24 |
| | | | | 220/270 |
| 2014/0084003 A1 | 3/2014 | Ramsey | | |

FOREIGN PATENT DOCUMENTS

| | | |
|---|---|---|
| JP | 2011-020701 A | 2/2011 |
| JP | 2013-030185 A | 2/2013 |
| WO | WO 00/03832 A1 | 1/2000 |
| WO | WO 2012/028611 A1 | 3/2012 |

\* cited by examiner

MATRIX BARCODES ON CAN COMPONENTS

CROSS-REFERENCE TO RELATED APPLICATIONS

This application is the National Stage of International Application No. PCT/US2014/023878, filed Mar. 12, 2014, which claims the benefit of U.S. provisional application No. 61/787,742, filed Mar. 15, 2013, the disclosures of which are incorporated herein by reference in their entirety.

BACKGROUND

This invention relates to containers, and more particularly to marking components of metal cans.

Two piece metal cans include a can body on which a can end is attached by a seam. Commercial two piece beverage cans are formed by a drawing and ironing process that forms the body sidewall integral with the base. Three piece metal cans include a cylindrical body, each end of which has a can end attached by a seam.

Two piece beverage cans are produced in vast quantities for beverages and foods use; three piece beverage cans are produced in vast quantities for food uses. Accordingly, the components of the cans must be produced at high speeds.

Conventional beverage cans and many easy open food cans have pull tabs. Pull tabs are formed from metal sheet in a tab press. Because of the quantities required, conventional tab presses form many tabs at once in multiple lanes.

Typically, pre-lacquered coil of aluminum is fed into a shell press to form the can end shells. A pre-lacquered coil of aluminum is fed into a tab press to form the pull tabs. The shells and pull tabs are combined in a conversion press to form the unseamed can end.

Decoration of can ends, especially pull tabs, is known. For example, U.S. Pat. No. 6,105,806 discloses laser etching or removal of portions of a coating on a pull tab. U.S. Pat. No. 6,498,318 acknowledges difficulties in marking metal cans and discloses ablating metal pull tab stock. There is a need for improved tab marking technologies.

SUMMARY

A process for high speed, high resolution decoration by laser marking for can components, such as ends, tabs, and coil is provided. The can ends and pull tabs resulting from the process are also provided.

A can end component includes a matrix barcode formed on the panel and consisting essentially of laser-formed dots. The matrix barcode is readable by a handheld wireless communication device. Where the can end component is a stay-on-pull tab for a can end, the tab comprises: a nose; a heel suitable for contact with a user's finger; a body extending between the nose and the heel where the body has a surface for receiving a rivet and a panel that has a coating; and a matrix barcode formed on the panel and consisting essentially of laser-formed dots, the matrix barcode being readable by a handheld wireless communication device. Where the can end component is an end itself, the barcode can be located anywhere on the end, and preferably on the center panel. Or the matrix barcode can be formed on the coil used for making the ends or tabs.

The dots can be made by a through-hole in a coating on the panel. Preferably, the matrix barcode is an inverse barcode such that the coating is dark such that the dots are through holes in the coating to a light or clear undercoating or bare metal. In this regard, the coating outside of the matrix barcode forms a quiet space consisting of a plain boarder at least 2 modules wide.

Each module of the matrix barcode can be formed by only one dot such that each one of the laser formed dots is between approximately 80% and 150% of the corresponding module size, preferably between approximately 100% and 150% of the corresponding module size, and more preferably between approximately 105% and 120% of the corresponding module size. The maximum spot size for some embodiments is no more than the square root of 2 times the corresponding module size. Or each module can be formed from multiple spots, such as are four spots or five spots including four spots having centers on the corners of a square and a fifth spot at a center. For the embodiment in which each module is made from more than one spot, the spots preferably overlap one another by less than 50 percent of the area.

The matrix barcode, if on the tab, may be formed on a topside of the pull tab or on an underside of the pull tab. The matrix barcode disclosed herein may be, for example, no more than 6 mm by 6 mm, at least 2 mm by 2 mm, at least 3 mm by 3 mm, at least 4 mm by 4 mm, or no more than 5 mm by 5 mm.

A method of marking a panel of a can component, such as a can end, a stay-on-pull tab for a can end, or corresponding coil, is provided that includes forming a matrix barcode described above is also provided. The method includes the steps of: applying a laser to produce dots on the metal panel. The dots form a matrix barcode readable by a handheld wireless communication device. The panel region to which the marking is applied can be a can end, a tab, or predetermined portion of a tab stock or end stock such that the applying step includes marking on the tab stock or end stock. The marking may be performed while the tab stock or coil is stationary (that is, during the dwell period) or moving.

The inventors contemplate that the laser marking process may be applied to tab stock coil, applied to the tabs after the tab press before the conversion press, applied to the end shells after the shell press before the conversion press, or after the conversion press to the unseamed can end. The inventors have demonstrated the process by making a 5 mm by 5 mm data matrix code having 14 by 14 elements on stationary tab stock within a dwell time of 55 milliseconds, which corresponds to a modern 725 strokes per minute tab making operation. Spots were formed by removing material from a dark coating on a panel on the underside of the tab.

DETAILED DESCRIPTION OF PREFERRED EMBODIMENTS

The inventors surmise that images may be formed by laser markings applied to food or beverage ends or to food or beverage can pull tabs in a high speed manufacturing environment.

The images preferably are matrix barcodes, which the inventors broadly intend to mean any information structure, especially two dimensional matrix codes that readable by a machine such as a wireless communication device. For example a QR code, a Data Matrix code, or preferably an inverse of a QR code or Data Matrix code are examples of the images that may be employed.

Preferably, the machine that reads the information formed by the process described herein is a handheld wireless communication device, which is intended to mean a smart phone of the type operated by a ubiquitous, common retail users (in other words, a "smartphone," such as an iphone or android phone, equipped with a camera and the ability to download applications), as distinguished from the type of industrial readers of one dimensional or two dimensional bar code readers that are employed for manufacturing or inventory purposes in an industrial or retail environment.

Figure 1A:
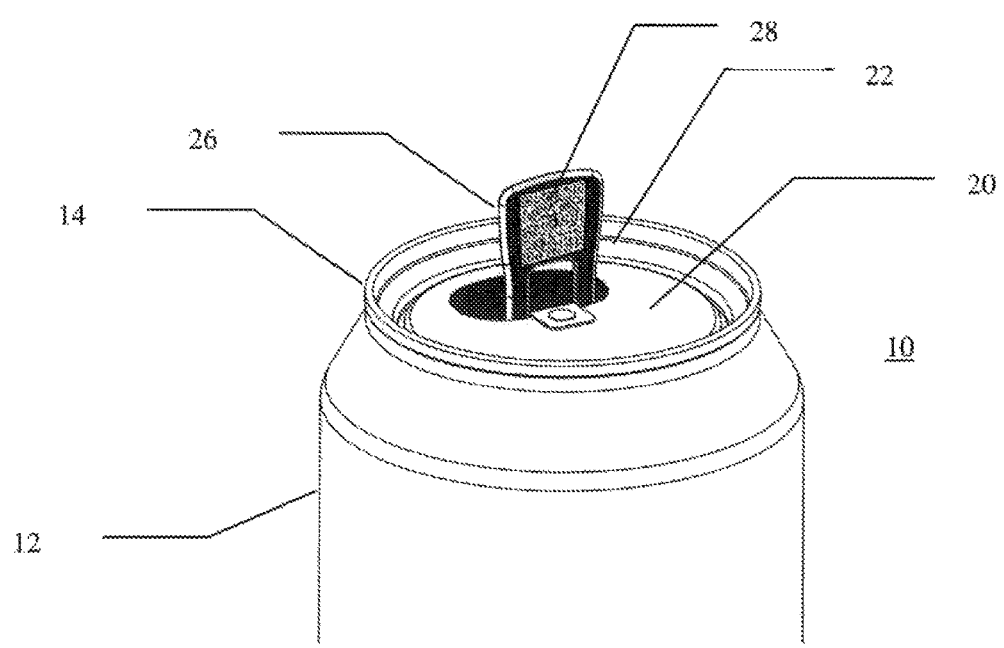
FIG. 1A is a schematic view of the can end showing the underside of the tab in its open, actuated position.

FIG. 1A illustrates a beverage can 10 that includes a can body 12 and a seamed can end 14. End 14 includes a center panel 20 and a chuck wall 22. The finished end also includes a pull tab 26 attached to the center panel by a rivet. The pull tab is shown in its fully actuated position after it has ruptured the score to create the pour opening. An image, that is a matrix barcode code 28, is located on the underside of tab 26 such that it would be visible only after actuation of tab 26. The present invention is not limited to beverage can ends, but encompasses other ends, such as ends on food cans. In this regard, the rivet for a beverage can includes a rivet island that forms a hinge, while a rivet for a food can end or a full aperture end for food or beverage typically does not include a hinge. The QR code is employed in the description merely as an example of an image that may be employed.

Figure 1B:
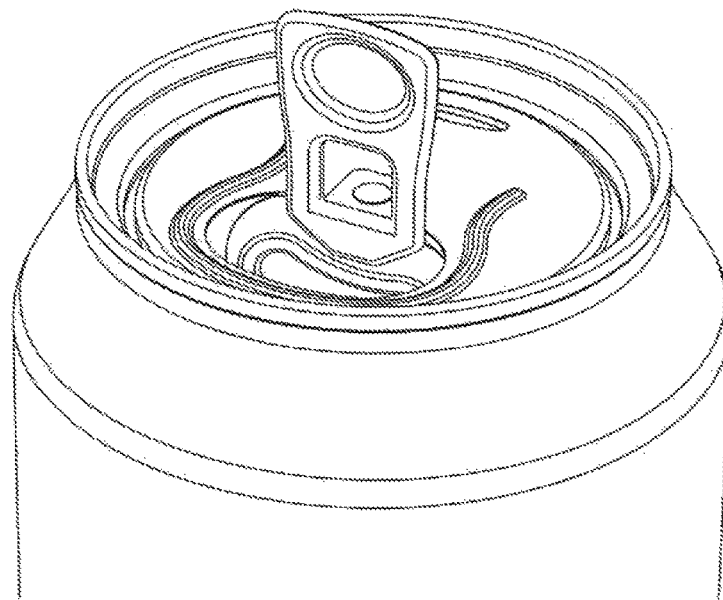
FIG. 1B is a view of a first embodiment can end showing the upper side of the tab in its open, actuated position.
Figure 1C:
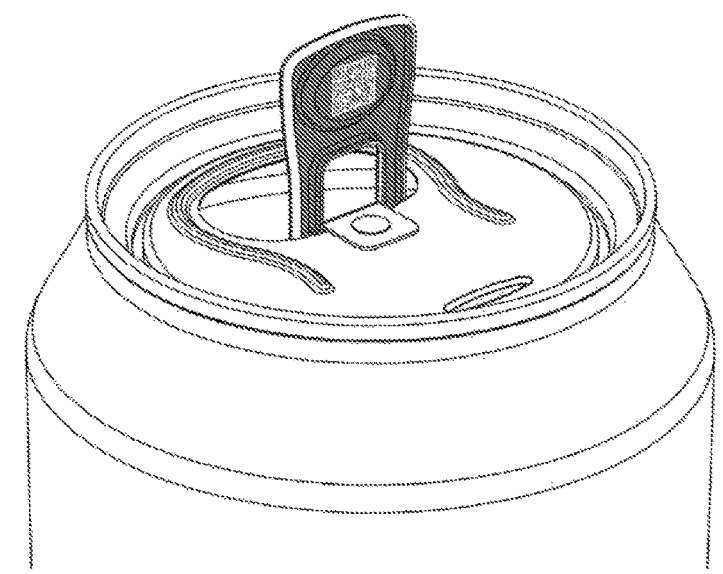
FIG. 1C is a view of the first embodiment can end showing the underside of the tab in its open, actuated position.
Figure 1D:
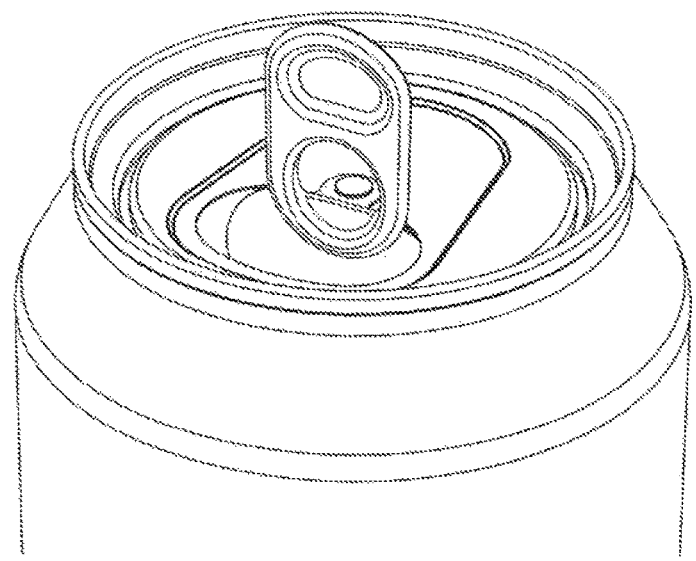
FIG. 1D is a view of a second embodiment can end showing the upper side of the tab in its open, actuated position.
Figure 1E:
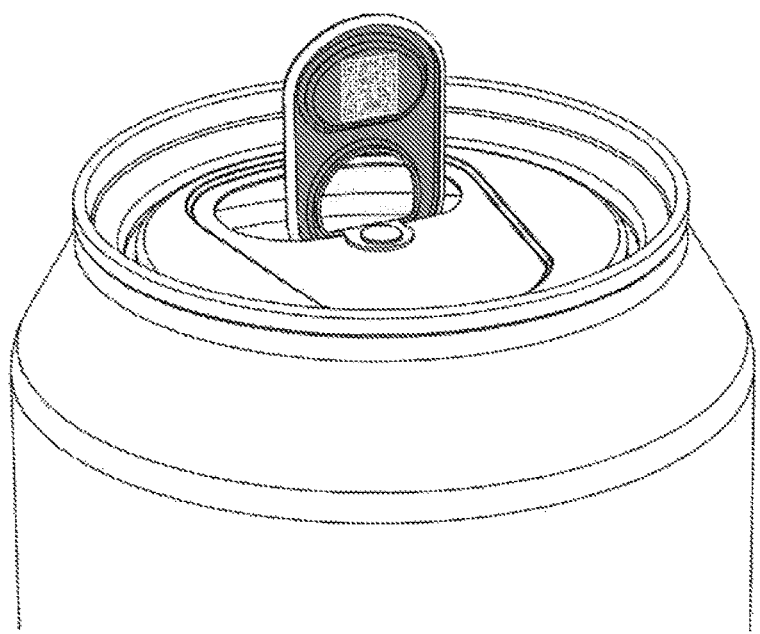
FIG. 1E is a view of the first embodiment can end showing the underside of the tab in its open, actuated position

FIGS. 1B and 1C illustrate a beverage can end having a configuration known in the industry as a DRT center panel or end. FIGS. 1D and 1E illustrate a beverage can end having a configuration known in the industry as a Stolle center panel or end. Each of the embodiments in the figures has a matrix barcode code printed on the tab underside. The present invention also encompasses a machine readable code on the topside of the tab 26 (not shown in the figures).

Figure 2:
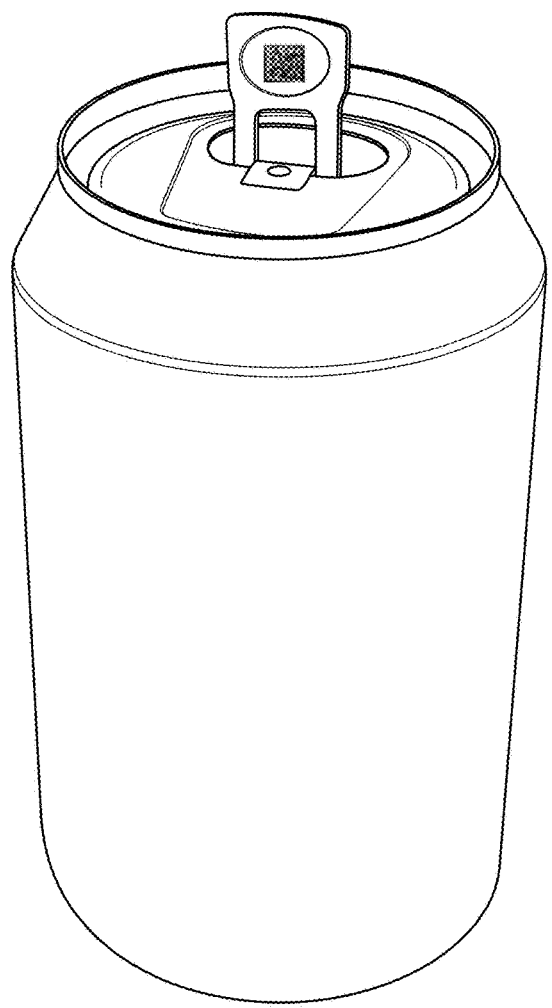
FIG. 2 is a perspective view of a matrix code applied to the tab.

FIG. 2 is a perspective view of a beverage can employing code 28 on a panel, according to another embodiment of the present invention in which the panel is flat and surrounded by structural ribs, or is embossed or debossed. The code 26 may also be formed on the tab topside (not shown in the figures). This could be used for example in a deposit recovery system where each can is required to have a unique code for identification in the recycling scheme.

Preferably a 5 mm by 5 mm data matrix code having 14 by 14 elements is formed in stationary tab stock within a dwell time of 55 milliseconds, which corresponds to a modern 725 strokes per minute tab making operation. The target time period may be shorter, as some tab making operations do not operate at 725 strokes for minute. Alternatively, the image may be formed on moving tab stock, as disclosed in co-pending U.S. patent application Ser. No. 13/584,521, entitled "Laser Marking System and Method," which is incorporated herein by reference.

Preferably, and as best shown in FIG. 2, the panel includes a dark coating. A conventional coating and methods for applying it may be employed. Thus, the dot forming process disclosed herein forms through-holes through the coating to reveal bare aluminum. The present invention encompasses multiple coatings in which one or more layers are removed to expose one or more under-layers, and also encompasses etching metal under the coating or any process that exposes or etches the metal in a way that enables the formation of a matrix barcode. Further processes are also envisaged where the laser beam modifies the surface properties of the substrate or coating so as to affect the optical properties to make a visible or invisible mark on the surface. A person of ordinary skill upon reading the present disclosure will understand how to form the coating and how to achieve the above matrix code in this regard.

For the accuracy and precision that is required to mark the substrates during a short time period enabled during the dwell period of the tab press, shell press or conversion press, or during the short time during which the moving tab stock may be marked, the inventors have determined that the marks (preferably by through-holes in the dark coating to expose a lighter color metal or undercoating) may be formed by applying a short burst of a laser to produce an approximately round through-hole.

Figure 6:
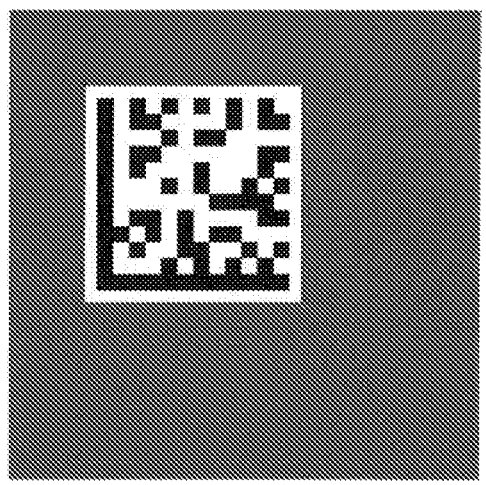
FIG. 6 is an enlarged image of conventional matrix barcode.
Figure 7:
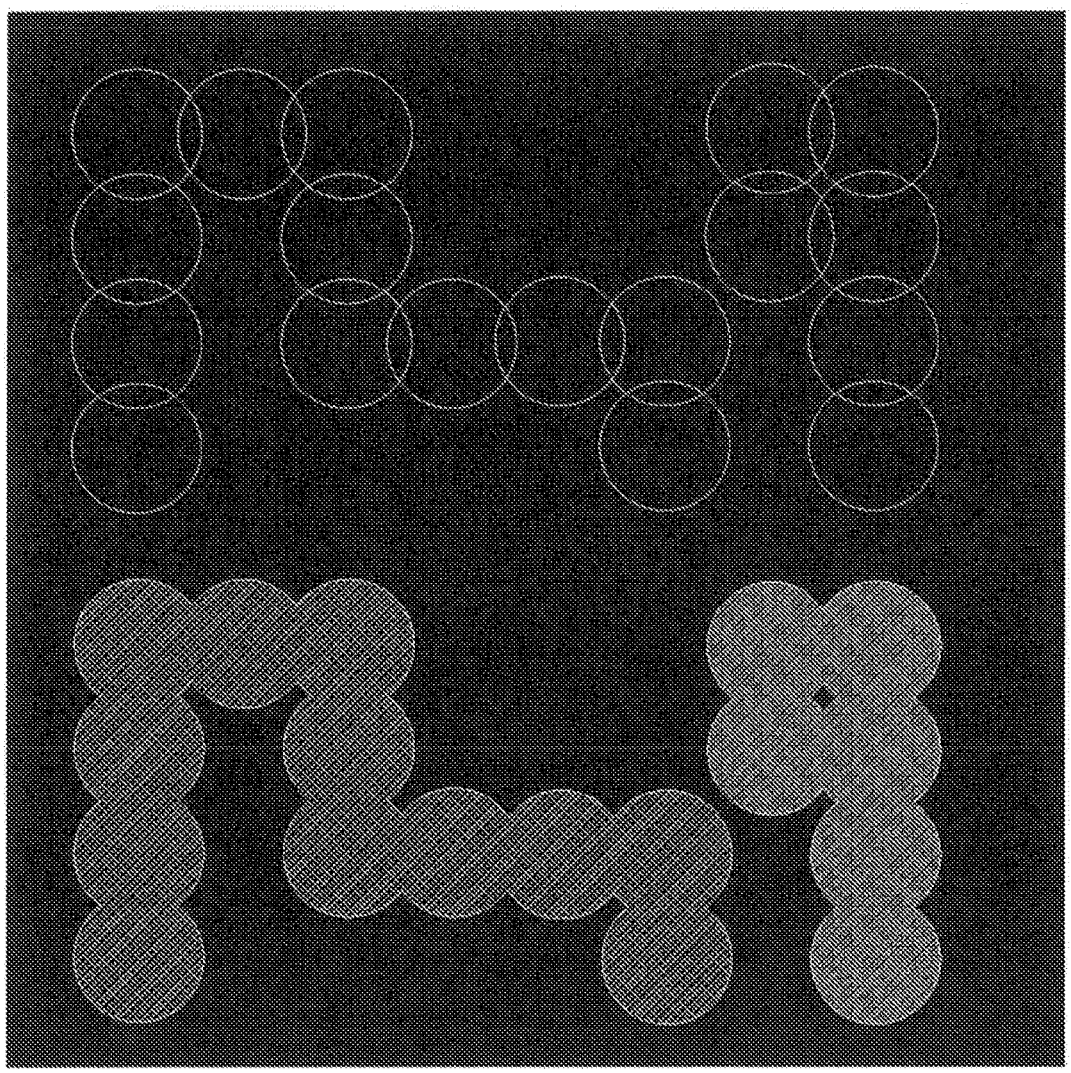
FIG. 7 is an enlarged illustration of spots formed according to an aspect of the present invention.

For a matrix barcode in which the smallest element is a square module, the marking preferably is achieved with spots of a diameter from 80 to 150% of the module size or spacing. Other preferred ranges include 100% and 150% of the corresponding module size, and approximately 105% and 120% of the corresponding module size. For embodiments in which the spot size is greater than the module size, the spots will overlap. Overlapping spots are preferred as this removes the surplus small marks between the spots, which improves readability. Therefore the target removal spot size is no more than the square root of 2 times larger than the module size. FIGS. 6 and 7 show a theoretical bar code and a sample of the module elements formed by laser spots.

Further, in the embodiments in which a coating is employed, the preferred matrix barcode is an inverted matrix code in which the dark color of the coating provides a natural and large quiet zone about the matrix barcode. Because area free for marking is a limit on tab marking technology, employing the dark coating as the quiet space enhances accuracy of reading and enables a tolerance on location of the marking during the application. Scanning applications for reading an inverted code are known.

Figure 8:
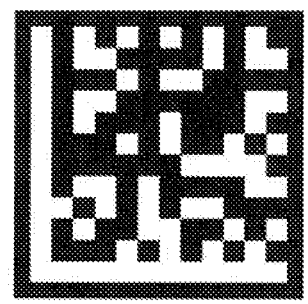
FIG. 8 is an enlarged image of an inverse of a conventional matrix barcode.
Figure 9:
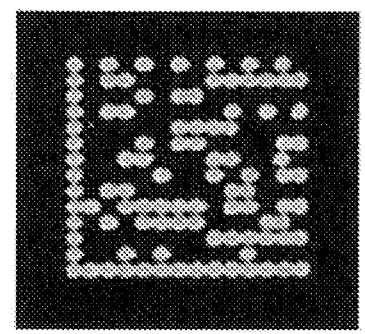
FIG. 9 is an enlarged image of an inverse of the conventional matrix barcode similar to that shown in FIG. 8.

FIG. 8 shows a 12 by 12 module inverted code of the type that may be employed in a tab panel. FIG. 9 shows a 14 by 14 module that may be formed within a 55 millisecond time period, which as described above was achieved in the short time period of modern tab making machinery. The example 14 by 14 module code gives up to 8 characters with upper & lower case letters plus numbers, thus over 200 trillion combinations.

Figure 10:
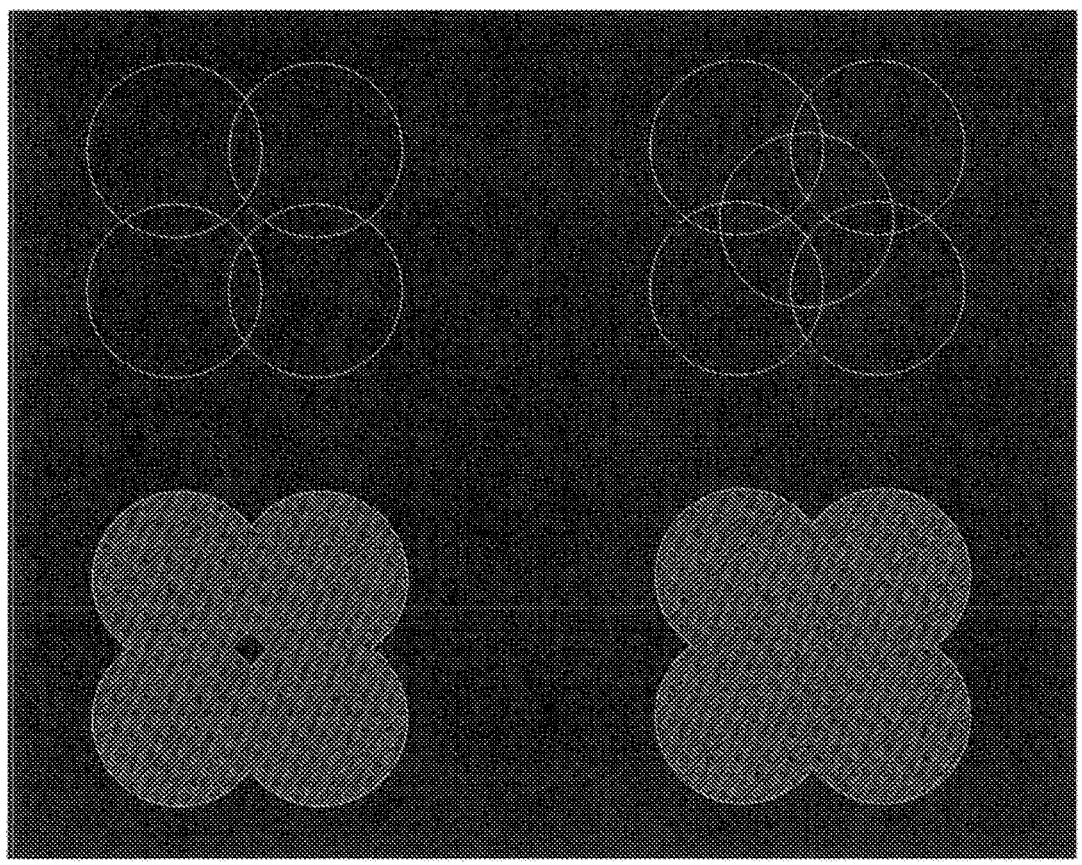
FIG. 10 is an enlarged illustration of matrix barcode modules from several laser spots.

Alternatively, each module may be formed by multiple laser spots, each of which is formed from a laser pulse. For example, the top left diagram of FIG. 10 illustrates four overlapping laser spots that may nearly fill the area of the desired module. The bottom left illustration in FIG. 10 shows the effect of the areas of the top left illustration. The particular size of each spot may be chosen according to parameters such as laser capabilities, substrate properties, desired module size, reader properties, and the like. For example, the spots may overlap from 0 to 50% of the area of each spot. The left side of FIG. 10 shows a spot overlap of approximately 20%.

Further, 'cleaning pulses' may be used to remove surplus marks between the pulses. For example, the top right and bottom right illustrations in FIG. 10 show a fifth spot at the center of four spots. The central fifth spot eliminates the star-shaped surplus or residual at the center of the four spots. Additional cleaning pulses are contemplated.

Figure 3:
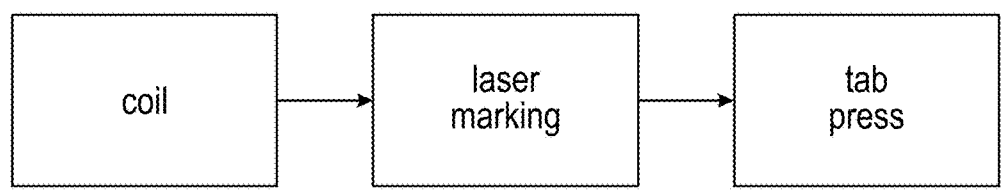
FIG. 3 is a flow chart of a manufacturing process showing a location of the laser marking process.

The laser marking process may be applied to tab stock coil, applied to the tabs after the tab press before the conversion press, applied to the end shells after the shell press before the conversion press, or after the conversion press to the unseamed can end. As illustrated in FIG. 3, the laser marking process may be performed on the tab stock coil before it enters the tab press. Known methods may be employed to register the marked coil for accurate tab forming relative to the images created by the laser marking. Thus, the output of the tab press in FIG. 6 would be marked tabs. As used herein, the term "coil" refers to the coiled metal stock and encompasses flat metal sheets that have been cut from the roll.

Figure 4:
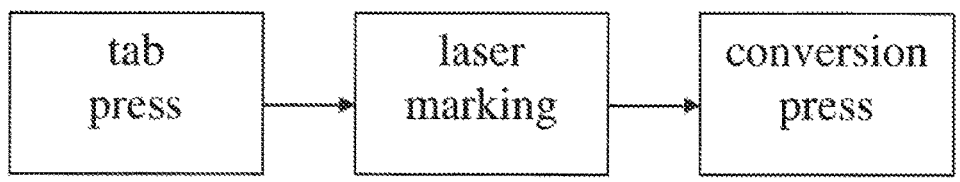
FIG. 4 is a flow chart of a manufacturing process showing another location of the laser marking process.

As illustrated in FIG. 4, the laser marking process may be performed on the tabs after they are formed in the tab press but before they are connected to the end shells in the conversion press.

Figure 5:
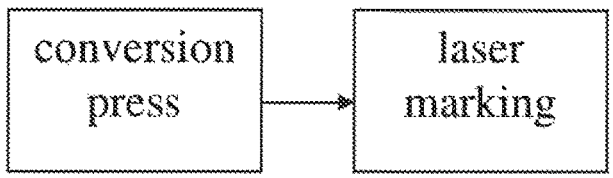
FIG. 5 is a flow chart of a manufacturing process showing another location of the laser marking process.

As illustrated in FIG. 5, the laser marking process may performed on the tabs and/or the can ends, such as the center panel or chuck wall, after the ends are formed in the conversion press.

The inventors surmise that matrix barcodes formed as disclosed herein may be used for the purposes disclosed in co-pending application Ser. No. 13/628,968, entitled "Can Ends Having Machine Readable Information," and in U.S. Patent Application 61/612,064, entitled, "Device, System, and Method for Facilitating Interaction Between A Wireless Communication Device and a Package Having a Unique Identifier."

The present invention has been explained using specific illustrations and aspects as examples. For example, the examples of the figures emphasize marking on a tab. But the present invention is not intended to be limited to the particular examples unless expressly stated in the claims.

I claim:

1. A can component having a matrix barcode formed thereon, the matrix barcode consisting essentially of laser-formed dots formed as through-holes in a coating on a panel region of the can component, the matrix barcode being readable by a handheld wireless communication device, the matrix barcode being an inverse barcode such that the coating is dark and the dots are through-holes in the coating to a surface that is lighter in color than the coating, the coating outside of the matrix barcode forms a quiet space including a plain border.

2. The can component of claim 1 wherein the can component is a stay-on-pull tab having: a nose; a heel suitable for contact with a user's finger; and a body extending between the nose and the heel, the body having a surface for receiving a rivet and a panel that includes the coating; the matrix barcode being formed on the tab.

3. The can component of claim 1 wherein the can component is a can end panel.

4. The can component of claim 1 wherein each one of the laser formed dots is positioned in a corresponding module of the matrix barcode.

5. The can component of claim 4 wherein each one of the laser formed dots is between approximately 80% and 150% of the corresponding module size.

6. The can component of claim 4 wherein each one of the laser formed dots is between approximately 100% and 150% of the corresponding module size.

7. The can component of claim 4 wherein each one of the laser formed dots is between approximately 105% and 120% of the corresponding module size.

8. The can component of claim 5 wherein the maximum dot size is no more than the square root of 2 times the corresponding module size.

9. The can component of claim 4 wherein the surface includes a light undercoating, a clear undercoating, or bare metal.

10. The can component of claim 9 wherein the quiet space has a width that is at least as wide as a width of at least 2 modules.

11. The can component of claim 2 wherein the matrix barcode is formed on a topside of the pull tab.

12. The can component of claim 2 wherein the matrix barcode is formed on an underside of the tab.

13. The can component of claim 1 wherein the matrix barcode has a size of no more than 6 mm by 6 mm.

14. The can component of claim 4 wherein the matrix barcode has a size of at least 2 mm by 2 mm.

15. The can component of claim 4 wherein the matrix barcode has a size of at least 3 mm by 3 mm.

16. The can component of claim 4 wherein the matrix barcode has a size of at least 4 mm by 4 mm and no more than 5 mm by 5 mm.

17. The can component of claim 1 wherein multiple laser formed dots are positioned within a module of the matrix barcode.

18. The can component of claim 17 wherein the multiple laser formed dots are four dots.

19. The can component of claim 17 wherein the multiple laser formed dots are five dots including four dots having centers on the corners of a square and a fifth dot at a center.

20. The can component of claim 17 wherein the laser formed dots overlap one another by less than 50 percent of the area.

* * * * *